Dec. 2, 1952  W. R. EHNLE  2,620,159
BALE TIE TIGHTENING APPARATUS
Filed Oct. 13, 1950
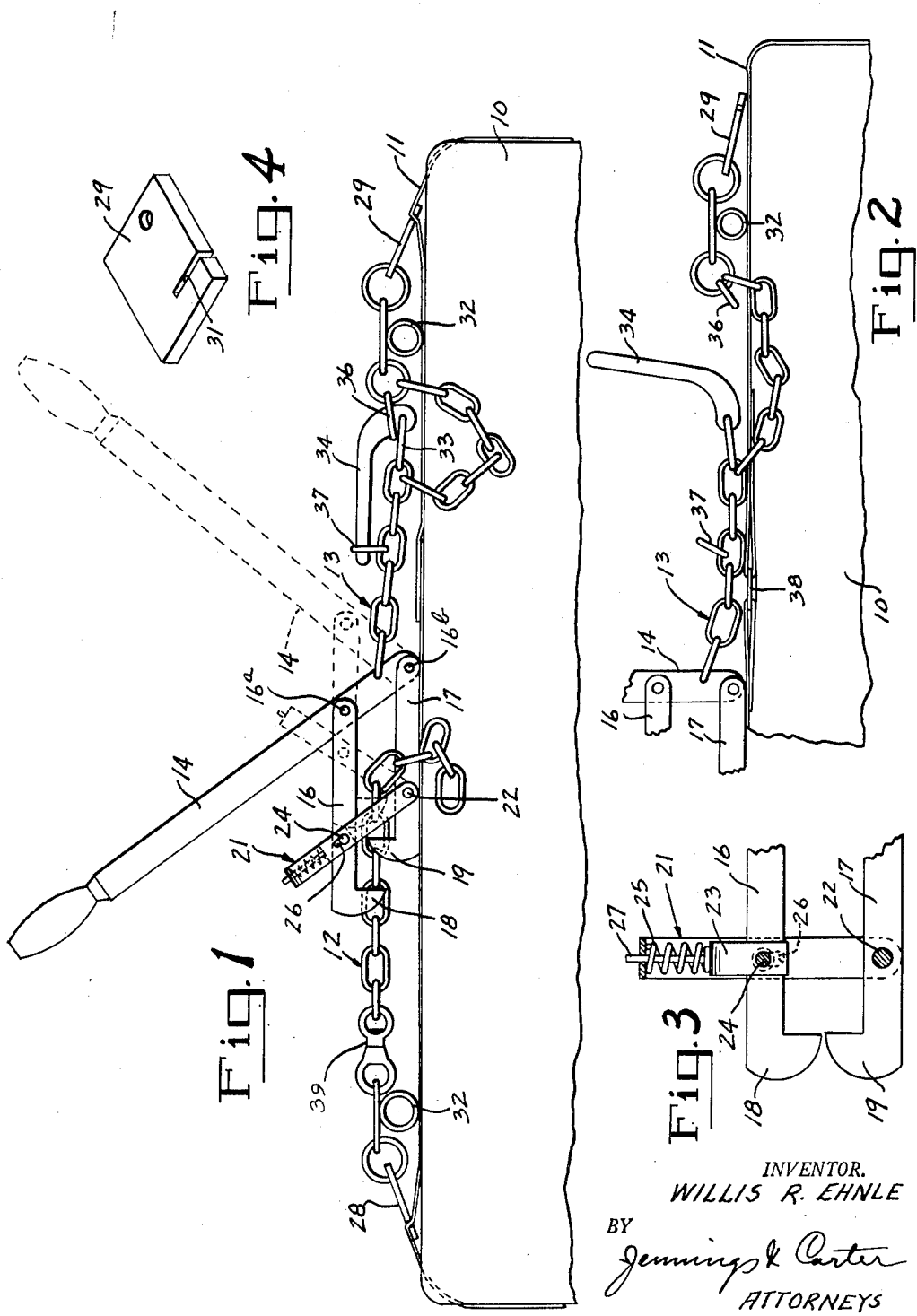
INVENTOR.
WILLIS R. EHNLE
BY
Jennings & Carter
ATTORNEYS Patented Dec. 2, 1952

2,620,159

UNITED STATES PATENT OFFICE 2,620,159

BALE TIE TIGHTENING APPARATUS

Willis R. Ehnle, Decatur, Ala.

Application October 13, 1950, Serial No. 189,932

3 Claims. (Cl. 254—75)

This invention relates to apparatus for tightening bale ties, particularly cotton bale ties which have become loose on the bale when handling. It often occurs around cotton gins, cotton compresses and other places where baled cotton is handled, that one or more of the ties on a bale become loose or broken and great difficulty has heretofore been encountered in tightening and re-tying such ties. When a bale tie on a cotton bale becomes loose, the bale at once swells at that portion and the cotton flares out and may become damaged and a great deal of it be lost. It is accordingly the particular object of my invention to provide apparatus whereby the ends of the loose tie may be drawn together and re-tied, thereby placing the bale in the same condition as when it came from the press.

Another object of my invention is to provide a bale tie tightener, including a pulling tool with chain pulling elements and means to hold the pulling elements elevated above the bale when pulling, thereby insuring that the pulling tool does not engage the bale and also affording space for re-tying the tie.

Still another object of my invention is to provide a bale tie tightener including chain pulling elements, together with means for taking up slack in the elements when drawing the ends of the tie together, and for releasing the slack when the tie has been secured.

Still another object of my invention is to provide a bale tie tightener including means for pulling the ends of the tie together and securing them, which shall be sturdy of design, simple of operation, and economical of manufacture.

Apparatus embodying features of my invention is illustrated in the accompanying drawing, forming a part of this application, in which:

Fig. 1 is an elevational view showing my improved apparatus tightening a bale tie about a bale;

Fig. 2 is a side elevational view showing the apparatus after a bale tie has been tightened and secured in place;

Fig. 3 is a fragmentary sectional view of the pawls with parts broken away; and

Fig. 4 is a perspective view showing one of the tie gripping members employed with my apparatus.

Referring now to the drawing for a better understanding of my invention I show in Fig. 1 a fragment of a bale 10 having a tie 11 extending thereabout to be tightened and secured by means of my improved apparatus. In tightening the tie 11 I employ a pair of chains 12 and 13 disposed in linear alignment over the tie 11. The chain 13 is secured to a lever 14 which has connected thereto pawls 16 and 17, pivotally connected at 16a and 16b on opposite sides of the point of connection of the chain 13. The pawls 16 and 17 are provided with hooks 18 and 19, respectively, adapted to engage the links of the chain 12. The pawls 16 and 17 are guided in their movements and held toward engagement with the links of the chain 12 by means of a yoke 21 which straddles the pawls 16 and 17 and is pivotally connected to the pawl 17 by means of a pin 22. Positioned within the yoke 21 is a second yoke 23 which is pivotally connected to a pin 24 passing through the yoke 23 and the yoke 21 and also through the pawl 16. The yoke 21 is provided with slotted holes 26 which permits up and down movement of the pin 24 and pawl 16 with respect to the yoke 21. Connected to the upper end of the inner yoke 23 is a rod 27 which extends out through the upper part of the yoke and a spring 25 bears against the yoke 23 to bias the pawls 16 and 17 toward each other so that they will upon reciprocation by means of the lever 14 engage the links of the chain 12. The apparatus so far described is well known and is now being manufactured and sold.

In accordance with my invention, I provide, on the outer end of the chain 12, a tie gripping element 28, and on the outer end of the chain 13 a similar tie gripping element 29. The tie gripping elements are identical in construction, one being shown in Fig. 4 as constituting a rectangular block having a narrow slit 31 therein through which the tie is adapted to pass and be engaged upon pulling the associated chain. Attached to each of the chains 12 and 13, between the lever 14 and the outer ends of the chain, is a boss 32 which serves, in operation, to hold the chains up off the bale and prevent the lever and pawl 17 from digging into the bale. They also provide a space between the chains and the bale whereby the ends of the tie 11 may be brought together.

Interposed in the chain 13 and pivotally connected to an extra link 33 therein, is an elongated hook member 34 which is adapted to be passed through a link, such as link 36, in advance of the hook, to take up slack in the chain 13. The hook 34 may be turned back as shown in Fig. 1 of the drawing and latched in place by a latch link, or detent, 37. This feature is important in that it provides a means whereby the bale tie may have its ends drawn together and tied with the usual buckle 38, shown in Fig. 2 of the drawing, and the slack released in the chain, thereby affording means whereby the chains may be readily disconnected from the bale tie.

From the foregoing, the operation of my improved bale tie tightener will be readily understood. The apparatus is placed over a tie 11, as shown in Fig. 1 of the drawing and the gripping elements 28 and 29 are connected to the loose end of the tie. The lever 14 is then oscillated back and forth to cause reciprocation of the pawls 16 and 17, which engage the links of the chains 12 and draw the ends of the tie 11 together. When sufficiently tightened, the ends are passed through the buckle 38 and secured. When drawing the ends of the tie 11 together, the elongated hook 34 is passed through the link 36 and held in place by the link 37, as shown in Fig. 1, to take up slack in the chain 13. As soon as the ends of the tie have been secured, as shown in Fig. 2, the hook 34 is released from the keeper, or detent, 37 to release the slack. Thereupon, the gripping members 28 and 29 are removed from the tie and the operation is completed. A swivel 39 is included in the chain 12 so that when tightening a bale tie, if the pull is started with a twist in the chain, it will automatically straighten out.

From the foregoing it will be apparent that I have devised an improved bale tie tightener which is sturdy of design, and effective in operation.

While I have shown my invention in but one form, it will be obvious to those skilled in the art that it is not so limited, but is susceptible of various changes and modifications without departing from the spirit thereof, and I desire therefore, that only such limitations shall be placed thereupon as are specifically set forth in the appended claims.

What I claim is:

1. In a bale tie tightener, the combination with a pair of chains extending in linear alignment and means to draw the adjacent ends of the chains toward each other, of tie gripping members on the outer end of each of the chains, means on each of the chains adjacent the tie gripping member to hold the chain in raised position, a hook member pivotally connected to a link of one of the chains and positioned to engage and pass through another link in the same chain advance of the link to which it is pivoted and take up slack in the chain, and releasable means to hold the hook in engaged position.

2. In a bale tie tightener, the combination with a pair of chains extending in linear alignment and lever means to draw the adjacent ends of the chains toward each other, of tie gripping members on the outer end of each of the chains, a boss on each of the chains between the tie gripping member and the lever means and adapted to slide along a bale as the tie is tightened, an elongated hook member connected to an intermediate link of one of the chains and adapted to pass through and engage another link in the same chain and draw it closer to the first mentioned link, and a releasable detent positioned to hold the hook in engaged position.

3. In a bale tie tightener including a pair of chains arranged in linear alignment over the ends of the tie and means to draw the adjacent ends of the chains closer together, a pair of tie gripping members mounted on the outer ends of the chains, each gripping member comprising a substantially rectangular block having a narrow slit adapted to engage said tie, a cylindrical boss on each of the chains adjacent the tie gripping member to hold the chains up off the bale, means to take up slack in one of the chains when pulling the ends of the tie together, and means to release the slack after the ends of the tie have been secured.

WILLIS R. EHNLE.

REFERENCES CITED

The following references are of record in the file of this patent:

UNITED STATES PATENTS

| Number | Name | Date |
|---|---|---|
| 858,240 | Weiner | June 25, 1907 |
| 1,365,823 | Gilbert | Jan. 18, 1921 |
| 1,451,410 | Trinkel | Apr. 10, 1923 |
| 1,538,330 | Horsley | May 19, 1924 |
| 2,860,695 | Stahl et al. | May 31, 1932 |